Aug. 11, 1931.  J. W. PETERSON  1,818,090
BRAKE SHOE AND METHOD OF MAKING SAME
Filed Jan. 10, 1927

INVENTOR
JOHN W. PETERSON
BY
M. W. McConkey
ATTORNEY

Patented Aug. 11, 1931

1,818,090

UNITED STATES PATENT OFFICE

JOHN W. PETERSON, OF SOUTH BEND, INDIANA, ASSIGNOR TO BENDIX BRAKE COMPANY, OF SOUTH BEND, INDIANA, A CORPORATION OF ILLINOIS

BRAKE SHOE AND METHOD OF MAKING SAME

Application filed January 10, 1927. Serial No. 160,016.

This invention relates to brake shoes, and is illustrated as embodied in a shoe for an internal expanding automobile brake. An object of the invention is to strengthen the shoe, and to facilitate its manufacture by improvements in the method of making it.

The shoe is preferably built up of an outer band, carrying the brake lining, reinforced by one or more stiffening members or webs, and an important feature of the invention relates to providing the edge of the web with projections passing through slots in the band and preferably welded thereto. I prefer to form the band with depressions about the slots, and to weld the projections in such a manner that the material of the projections flows into and substantially fills the depressions, thus in effect forming integral rivet heads securing the web to the band. An important minor feature of the invention relates to forming the edges of the projections on arcs struck about a center about which the band is swung in assembling the band and web, thus greatly facilitating the assembly of these parts.

Another feature of the invention relates to securing absolute alinement of spaced bearings at the end of the shoe, and of such bearings with respect to a slot formed in the shoe for the passage of the end of an auxiliary shoe, by initially building up the shoe with a single long bearing member and without any slot, and then separating the bearing member into two spaced bearings by a cut which removes the required amount of material to secure the desired spacing of the bearings and which also forms the desired slot in the shoe itself.

The above and other objects and features of the invention will be apparent from the following description of one illustrative embodiment shown in the accompanying drawings, in which.

Figure 1:
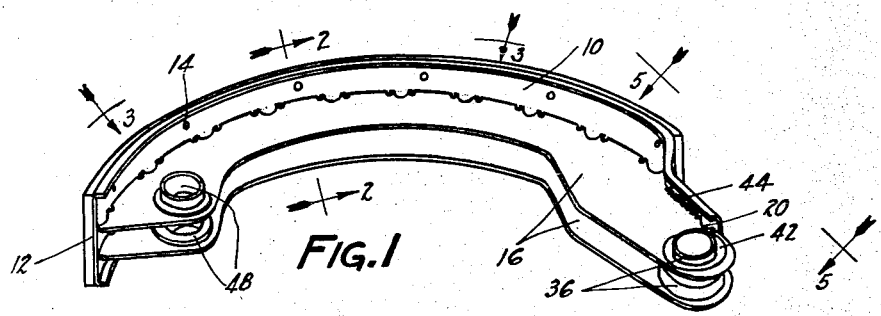
Figure 1 is a perspective view of the finished shoe, looking generally toward its inner side.

The shoe illustrated in Figure 1 is the secondary shoe of a three-shoe automobile brake of the type described generally in Patent No. 1,628,388, granted Bendix Brake Company on May 10, 1927, on an application of John R. Cautley. The shoe is intended to be anchored on a pivot at one end, at which end it overlaps the anchored end of a cooperating auxiliary shoe, and at its opposite end it is intended to be connected by a floating pivot to the end of a servo or primary shoe. The present invention relates to the structure of the shoe and to its manufacture.

The finished shoe comprises principally an arcuate band 10, to which the lining 12 is shown secured by rivets 14, and two reinforcing members or stiffening webs 16 secured to the inner face of the band 10. Webs 16 are spaced far enough apart so that at their ends they may straddle the ends of the primary and auxiliary shoes of the brake.

An important feature of the invention relates to the manner of securely fastening the band 10 and webs 16 together. The band is formed with a series of slots 18 to fit over rounded projections 20 on the edge of the web.

Figure 4:
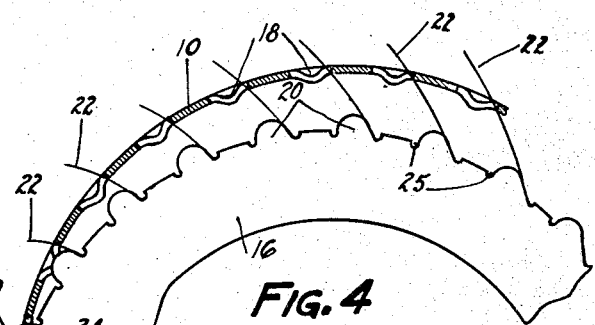
Figure 4 is a longitudinal section in a plane corresponding to the line 4—4 of Figure 3, and showing the band and web being assembled.
Figure 3:
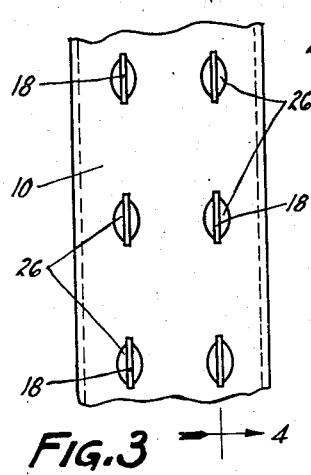
Figure 3 is an elevation of the outer blank or band before it is embodied in the shoe, viewing it from the general point of view of the arrows 3—3 of Figure 1.

In order to facilitate assembly of the parts, the projections 20, on the sides furthest from the end of the shoe, are all formed on circular arcs 22 having as their common center the center 24 of the projection 20 at the end of the shoe. In assembling the parts, as shown in Figure 4, the band 10 is swung upon the end lug 20 as a fulcrum, about the center 24, so that each slot 18 swings smoothly over its projection 20 without interference, or of course the band 10 may be held and the web 16 swung about center 24. Notches 25 may be provided to avoid interference with burrs that may be formed on the edges of the slots 18.

Figure 2:
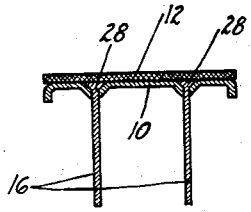
Figure 2 is a section through the finished shoe on the line 2—2 of Figure 1.

Each slot 18 is preferably surrounded by a depression 26, shown as oval in form, and after the parts are assembled as described above, the projections 20 are melted down, in a welding operation of the general type of spot-welding, substantially to fill the depressions 26 and to form what are in effect integral rivet heads 28 (Figure 2). Since the welding heats the parts, on cooling down after the welding the web 16 and projections 20 shrink, this forming a very tight and close joint with band 10.

At the end of the finished shoe there is an opening 38, for the passage of the anchored end of the adjacent auxiliary shoe, and which is narrowed down at the end of the shoe to form a mere slot 32, just wide enough to position the auxiliary shoe laterally, extending between lugs 34 on the band 10 and two bushings or bearings 36 secured to the webs 16 and adapted to be mounted on the anchor or fixed pivot of the shoe.

Figures 5, 6:
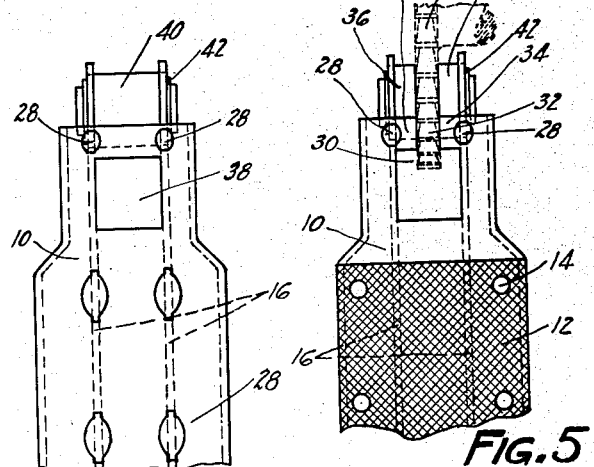
Figure 5 is a partial elevation of the end of the finished shoe, looking in the direction of the arrows 5—5 of Figure 1.
Figure 6 is a view corresponding to Figure 5, but before the lining is attached and before the final cut separating the two bearings.

To insure the greatest accuracy of the slot 32, and of the alinement of bearings 36, I prefer to form the shoe nearly up to the last operation as shown in Figure 6. There is provided an opening 38 in band 10, and a single bearing member 40 having shoulders at its ends to engage the inner faces of webs 16.

Flanges 42 on the ends of bearing member 40 are peened or spun over against the outer faces of webs 16, to lock the ends of the bearing member to the webs, or if preferred the ends of the bearing member may be welded permanently to the webs. I prefer also to strengthen the end of the shoe by arc welds 44 extending from the end of band 10 along the junction with webs 16, at least past the opening 38.

After completing the shoe to the stage shown in Figure 6, the slot 32 is formed by removing the surplus material, as for example by a cutter 46 indicated in dotted lines in Figure 5. This also separates member 40 into two bearings 36 absolutely alined with slot 32, and with each other.

At the opposite end of the shoe, bearings 48 may be welded or otherwise secured to webs 16, for the floating pivot of the primary or servo shoe.

While a particular shoe, and particular steps in its manufacture, have been described in detail, it is not my intention to limit the scope of the invention by that description, or otherwise than by the terms of the appended claims.

I claim:

1. A brake shoe comprising, in combination, an arcuate band formed with openings surrounded by depressions, and a strengthening web having projections extending through the openings and welded down into the depressions.

2. A brake shoe comprising in combination, an arcuate band formed with slots surrounded by oval depressions, and a strengthening web having flat projections extending outwardly through the slots and welded down into the depressions.

3. That method of manufacturing a brake shoe which comprises forming an arcuate band with openings surrounded by depressions and forming a strengthening web with corresponding projections, assembling them with the projections extending through the openings, and melting the projections down into the depressions by a welding operation.

4. That method of manufacturing a brake shoe which comprises forming an arcuate band with a series of openings, forming a strengthening web with a corresponding series of projections all curved on their corresponding sides about the same center, relatively moving the band and web about said center to assemble them with the projections in the openings, and securing the band and web together.

5. That method of manufacturing a brake shoe which comprises forming an arcuate band with a series of openings, forming a strengthening web with a corresponding series of projections all curved on their corresponding sides about a single center at the end of the web, relatively moving the band and web about said center to assemble them with the projections in the openings, and securing the band and web together.

6. A blank for the web of a brake shoe comprising a generally arc-shaped piece with projections along its outer edge all curved on their corresponding sides about the same center.

7. A blank for the web of a brake shoe comprising a generally arc-shaped piece with projections along its outer edge all curved on their corresponding sides about a single center at one end of the blank.

8. A brake shoe having at one end two spaced bearings with inner opposed flat parallel faces, and also having an outer portion formed with a slot extending from its end with its sides accurately positioned in the planes of said faces.

9. A brake shoe having at its end two spaced webs formed with projections, a band extending across said webs and having openings receiving said projections, and an arc weld securing at least a part of the outer edges of the webs to the inner face of the band independently of the projections.

10. A brake shoe having at its end two spaced webs formed with projections, a band extending across said webs and having openings receiving said projections and formed near the end of the shoe with an opening between said webs, and means securing the outer edges of the webs to the inner face of the band independently of the projections along the opposite sides of said opening.

11. A brake shoe comprising a band formed with openings and a strengthening web having projections extending into the openings and arc-welded, along at least part of its outer edge, to the inner face of said band.

12. A brake shoe comprising, in combination, an arcuate band having at least one opening, and a separately-formed strengthening web engaging the inner face of the band and having at least one projection extending through said opening and taking the shearing strains tending to separate the band from the web lengthwise of the shoe and which web is secured to said band.

13. A brake shoe comprising an arcuate, separately-formed band having slots and web members having interlocking tongue means projecting through the slots taking shearing strains tending to separate said members lengthwise of the shoe.

14. A brake shoe comprising an arcuate band having at least one opening, in combination with a separately-formed web curved along its outer edge on the same arc as the inner face of said band and seated against the inner face of said band and having at least one projection extending outwardly through said opening.

15. A brake shoe comprising an arcuate band having openings, a pair of spaced webs curved along their outer edges on the same arc as the inner face of said band, said webs having projections engaging said openings, and means for securing the webs to the band.

16. A brake shoe comprising an arcuate band having parallel rows of slots, a pair of webs curved along their outer edges on the same arc as the inner face of said band, said webs having projections thereon engaging the end walls of the slots and means for securing the webs to the band.

17. A brake shoe strengthening web formed with projections extending radially and adapted to be rocked into engagement with a shoe rim having slots corresponding to the projections.

18. A brake shoe strengthening web formed with radial projections having sides curved about a common center, and adapted to be rocked about the center into engagement with a shoe having slots.

In testimony whereof, I have hereunto signed my name.

JOHN W. PETERSON.